United States Patent
Kim

(10) Patent No.: US 7,068,441 B2
(45) Date of Patent: Jun. 27, 2006

(54) ZOOM LENS OPTICAL SYSTEM

(75) Inventor: Yong-Wook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/169,741

(22) Filed: Jun. 30, 2005

(65) Prior Publication Data

US 2006/0012886 A1    Jan. 19, 2006

(30) Foreign Application Priority Data

Jul. 13, 2004  (KR) ...................... 10-2004-0054431

(51) Int. Cl.
*G02B 15/14* (2006.01)

(52) U.S. Cl. ...................... 359/686; 359/676; 359/683; 359/684; 359/685; 359/715; 359/714; 359/713; 359/726; 359/740; 359/763

(58) Field of Classification Search ................ 359/676, 359/686–688, 683–685, 713–715, 726, 740, 359/763–769
See application file for complete search history.

(56) References Cited

U.S. PATENT DOCUMENTS

| | | | |
|---|---|---|---|
| 3,649,101 A * | 3/1972 | Straw et al. ................ | 359/686 |
| 4,000,935 A * | 1/1977 | Shoemaker ................ | 359/705 |
| 5,504,626 A | 4/1996 | Oshikiri et al. | |
| 6,865,026 B1 * | 3/2005 | Nozawa et al. ............. | 359/689 |
| 2004/0201903 A1 * | 10/2004 | Achtner ...................... | 359/687 |

FOREIGN PATENT DOCUMENTS

| | | |
|---|---|---|
| JP | 2004-163477 | 6/2004 |
| KR | 1996-0006421 | 5/1996 |
| KR | 1996-008397 | 6/1996 |
| KR | 1998-074173 | 11/1998 |

OTHER PUBLICATIONS

European Patent Office Search Report dated Dec. 5, 2005.

* cited by examiner

*Primary Examiner*—Evelyn A. Lester
(74) *Attorney, Agent, or Firm*—Roylance Abrams Berdo Goodman LLP

(57) ABSTRACT

A zoom lens optical system includes a first optical group with a first lens having negative refraction, a second lens having positive refraction, and a light path changing unit to change the path of an incident light passing through the first lens to have light incident on the second lens. A second optical group is provided for varying magnification. The second optical group has a third lens having negative refraction, a fourth lens, and a fifth lens, wherein the fourth and fifth lenses are integrally connected and have negative refraction. A third optical group includes an iris diaphragm, a sixth lens having positive refraction, and a seventh lens having negative refraction. A fourth optical group is provided for focusing. The fourth optical group has an eighth lens and a ninth lens being integrally connected and both having positive refraction.

6 Claims, 2 Drawing Sheets

ZOOM LENS OPTICAL SYSTEM

CROSS-REFERENCE TO RELATED APPLICATIONS

This application claims the benefit under 35 U.S.C. § 119(a) of Korean Patent Application No. 2004-54431, filed on Jul. 13, 2004, the entire disclosure of which is hereby incorporated by reference.

BACKGROUND OF THE INVENTION

1. Field of the Invention

The present invention relates in general to a zoom lens optical system. More particularly, the present invention relates to a zoom lens optical system equipped with a light path changing prism for minimizing the size of a vertical type photographic device.

2. Description of the Related Art

Two types of moving image photographing devices are gunshot photographing devices and vertical photographing devices. Both devices are gaining popularity with customers. The gunshot type photographing devices are relatively larger in size than the vertical type photographing devices, but, it is easier for users to operate the gunshot type photographing devices. For instance, users can operate other functions of the devices while photographing. Typically, a user needs both hands to hold the device to photograph sharp and clear images. Alternatively, the vertical type photographing devices are convenient to carry and one hand is typically suitable to operate the device and photograph images at the same time. For convenience reasons, the vertical type photographing devices are more popular now.

Since the gunshot type photographing devices are more broadly used, commercialized photographing techniques are also more prevalent for the gunshot type photographing devices. This is also the reason that a vertical type photographing device shown in FIG. 1 uses a zoom lens optical system that is applicable to a gunshot type photographing device for photographing a subject.

Referring to FIG. 1, a conventional zoom lens optical system 100 includes a first lens group 110 for transferring an object to an image, a second lens group 120 for varying magnification, a third lens group 130 disposed at a distance from an iris diaphragm 100a to transfer the image of the object, and a fourth lens group 140 for focusing. Particularly, two dotted lines, a long dashed dotted line, and a long dashed double-dotted line represent light paths showing the image of the object.

However, the typical zoom lens optical system 100 is designed specifically for the gunshot type photographing device. Thus, there are limits to apply the zoom lens optical system 100 to the vertical type photographing device. That is, the zoom lens optical system 100 is so large that it is not suitably applied to the conventional vertical type photographing device because of its size. If the vertical type photographing device is increased in size, its attraction as a handy, convenient product is diminished. Thus, commercialization of the device is made more difficult. Meanwhile, the related art zoom lens optical system 100 includes four lens groups 110, 120, 130, and 140, so it cannot be applied to a CCD (Charge Coupled Device), which has a high number of pixels, and does not deliver high-definition, high-resolution images.

Accordingly, there is a need for a zoom lens optical system capable of minimizing the size of a vertical type photographing device while delivering high-resolution images.

SUMMARY OF THE INVENTION

An aspect of the present invention is to solve at least the above problems and/or disadvantages and to provide at least the advantages described below. Accordingly, an aspect of the present invention is to provide a zoom lens optical system capable of reducing the length of a vertical type photographing device and delivering high-resolution images.

To achieve the above aspects and advantages, there is provided a zoom lens optical system. The zoom lens optical system includes a first optical group comprising a first lens having negative refraction, a second lens having positive refraction, and a light path changing unit to change the path of incident light passing through the first lens to have the light incident on the second lens. A second optical group varies magnification and comprises a third lens having negative refraction, a fourth lens, and a fifth lens. The fourth and fifth lenses are integrally connected and have negative refraction. A third optical group includes an iris diaphragm, a sixth lens having positive refraction, and a seventh lens having negative refraction. A fourth optical group for focusing comprises an eighth lens and a ninth lens being integrally connected and both having positive refraction.

Preferably, the zoom lens optical system further includes a fifth optical group for correcting final aberration. The fifth optical group includes a tenth lens having negative refraction and an eleventh lens having positive refraction.

Preferably, the light path changing unit is a prism or a reflector, and the second lens is an aspheric lens.

It is also preferable, that a side of the sixth lens facing a seventh lens is fused onto the iris diaphragm. Moreover, it is preferable that a distance between the side of the sixth lens and the iris diaphragm is not greater than 0.2 mm ($\leqq 0.2$ mm).

Other objects, advantages, and salient features of the invention will become apparent to those skilled in the art from the following detailed description, which, taken in conjunction with the annexed drawings, discloses preferred embodiments of the invention.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF THE EMBODIMENT

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
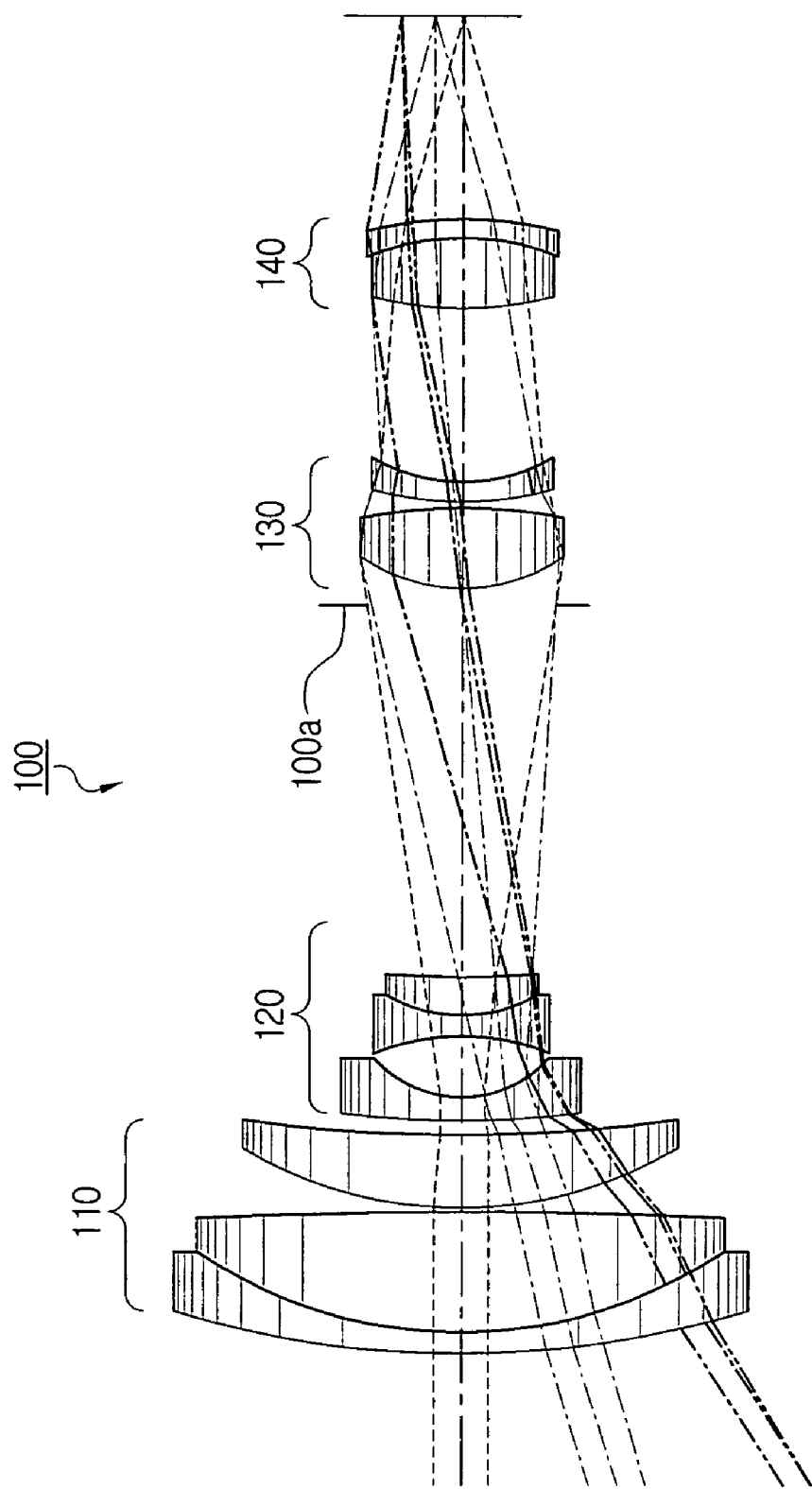
FIG. 1 illustrates a conventional zoom lens optical system.
Figure 2:
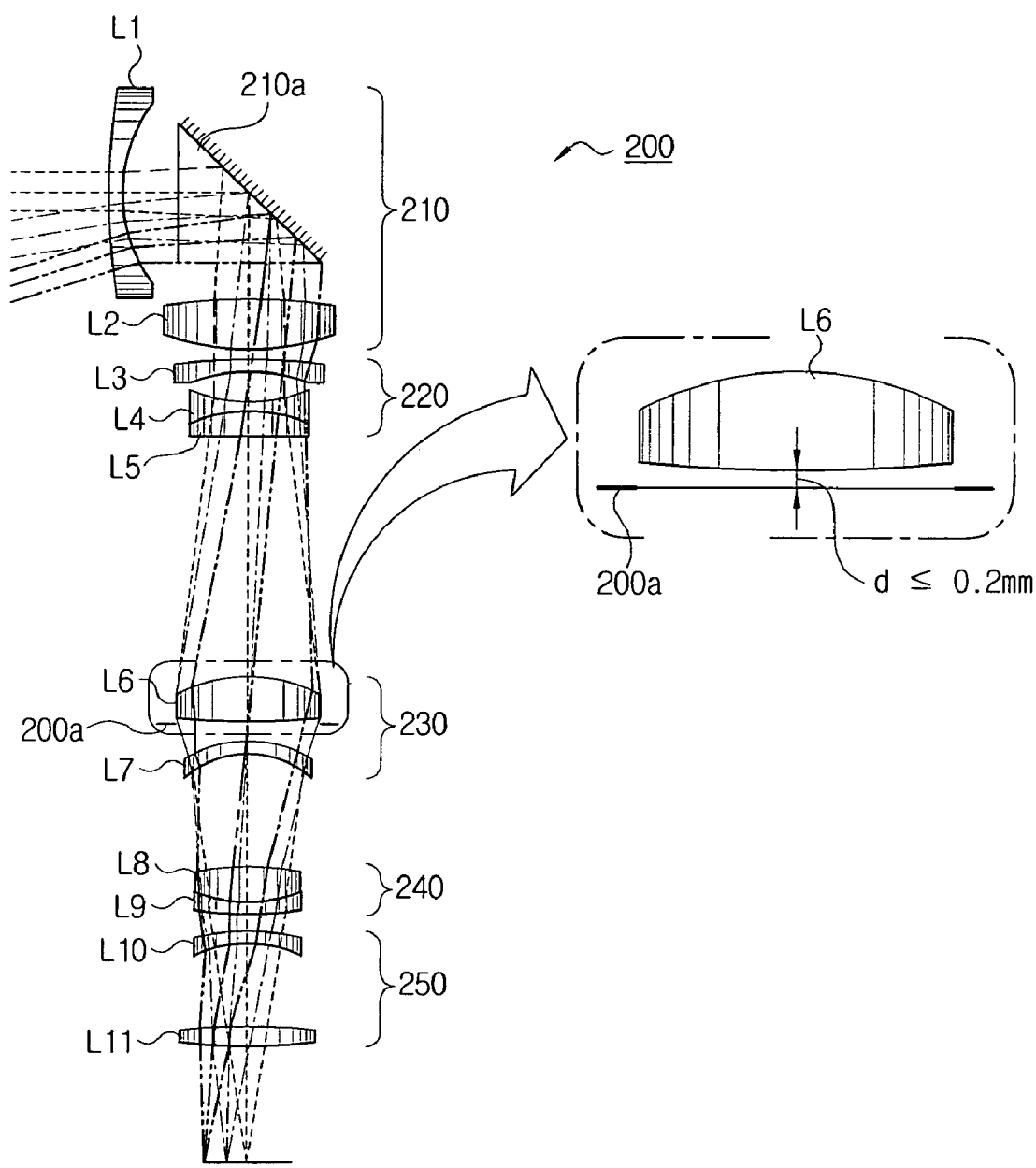
FIG. 2 illustrates a zoom lens optical system according to an embodiment of the present invention.

FIG. 2 illustrates a zoom lens optical system according to an embodiment of the present invention.

As shown in FIG. 2, the zoom lens optical system 200 includes a first optical group 210, a second optical group 220, a third optical group 230, a fourth optical group 240, and a fifth optical group 250. In FIG. 2, a dotted line, a long dashed dotted line, and a long dashed double-dotted line represent light paths showing an image of an object.

The first through fifth optical groups 210, 220, 230, 240, and 250 of the zoom lens optical system 200 are sequentially disposed from the object side (that is, the first optical group is closest to the object) in a lens barrel (not shown) of the vertical type photographing device (not shown). A second lens L2 of the first optical group 210. Moreover, the second optical group 220, the third optical group 230, the fourth optical group 240, and the fifth optical group 250 are sequentially arranged on an optical axis (not shown) from a light path changing unit 210a.

Preferably, the first optical group 210, the third optical group 230, and the fifth optical group 250 are fixedly installed in the lens barrel (not shown), while the second optical group 220 and the fourth optical group 240 are movably installed therein.

The first optical group 210 is a front group, and transfers an image of an object. To this end, the first optical group 210 includes a first lens L1, a light path changing unit 210a, and a second lens L2.

The first lens L1 has negative refraction, and transfers incident light showing the image of an object to the light path changing unit 210a.

The light path changing unit 210a changes the path of incident light passing through the first lens L1 and makes the light incident on the second lens L2. As for the light path changing unit 210a, at least one prism or at least one reflector, such as a mirror, can be used. In the present embodiment, a prism is used as the light path changing unit 210a.

The second lens L2 has positive refraction and transfers to the second optical group 220 the light whose path was changed by the light path changing unit 210a. An aspheric lens is used as the second lens L2 and serves to reduce the length of the zoom lens optical system 200. This is made possible because one aspheric lens is equivalent to 2–3 spherical lenses.

The second optical group 220 is a zoom lens group involved in zooming, such as varying the magnification of the optical system. To this end, the second optical group 220 includes a third lens L3 having negative refraction, a fourth lens L4, and a fifth lens L5. The fourth and fifth lenses L4, L5 have negative refraction and are joined together.

The third optical group 230 is a relay lens group. The third optical group 230 transfers light to the fourth optical group 240 to show an image with magnification varied by the second optical group 220. To this end, the third optical group 230 includes a sixth lens L6 having positive refraction, an iris diaphragm 200a, and a seventh lens L7 having negative refraction.

The sixth lens L6 and the seventh lens L7 are fused together directly to the iris diaphragm 200a through a fusing process. More specifically, one side of the sixth lens L6 facing the seventh lens L7 is thermally fused onto the iris diaphragm 200a. A distance (d) from the most rounded part on one side of the sixth lens L6 to the iris diaphragm 200a is preferably 0.2 mm or less. In this manner, it is possible to increase the percentage of space used in the vertical type photographing device (not shown). Moreover, the length of the zoom lens optical system 200 is minimized. Consequently, the vertical type photographing device (not shown) may be minimized in size.

The fourth optical group 240 is a focusing lens group involved in variation of magnification and focuses an image according to a change of distance to the object. To this end, the fourth optical group 240 includes an eighth lens L8 and a ninth lens L9 that are joined together and have positive refraction.

The fifth optical group 250 is a compensation lens group which converges light through the fourth optical group 240 and corrects final aberration of the converged light. To this end, the fifth optical group 250 includes a tenth lens L10 having negative refraction, and an eleventh lens L11 having positive refraction.

According to an embodiment of the present invention, the light path changing unit 210a, such as a prism, contributes significantly to the reduction of the length of the zoom lens optical system 200 having aligned optical groups. By fusing the third optical group 230 onto the iris diaphragm 200a, the vertical photographing device (not shown) mounted with the zoom lens optical system 200 is minimized in size.

Preferably, the first through eleventh lenses L1–L11 used in the zoom lens optical system 200 are made of glass or plastic material.

The zoom lens optical system 200 is applicable to all kinds of photographing devices including camcorders and still cameras that are vertical type photographing devices (not shown).

In conclusion, the zoom lens optical system in accordance with an embodiment of the present invention includes eleven lenses in five optical groups and a prism. These elements collectively minimize the size of the zoom lens optical system. Particularly, by using aspheric lenses as the front group lenses to fuse the third optical group onto the iris diaphragm, it becomes possible to correct optical aberration within a narrow space. Therefore, the size of the zoom lens optical system is minimized.

Moreover, the five optical groups make it possible to achieve improved correction of aberration against a large number of pixels, such as a mega pixel. Thus, high-resolution images can be delivered.

Therefore, the total size of the vertical photographing device adopting the zoom lens optical system is minimized. Thus, product value and product competitiveness is increased.

While the invention has been shown and described with reference to certain embodiments thereof, it will be understood by those skilled in the art that various changes in form and details may be made therein without departing from the spirit and scope of the invention as defined by the appended claims.

What is claimed is:

1. A zoom lens optical system, comprising:
 a first optical group comprising a first lens having negative refraction, a second lens having positive refraction, and a light path changing unit to change the path of incident light passing through the first lens to have the light incident on the second lens;

a second optical group for varying magnification, comprising a third lens having negative refraction, a fourth lens, and a fifth lens, wherein the fourth and fifth lenses are integrally connected and have negative refraction;

a third optical group comprising an iris diaphragm, a sixth lens having positive refraction, and a seventh lens having negative refraction; and a fourth optical group for focusing, comprising an eighth lens and a ninth lens being integrally connected and both having positive refraction.

2. The zoom lens optical system according to claim 1, further comprising a fifth optical group for correcting final aberration, comprising a tenth lens having negative refraction, and an eleventh lens having positive refraction.

3. The zoom lens optical system according to claim 1, wherein the light path changing unit is a prism or a reflector.

4. The zoom lens optical system according to claim 1, wherein the second lens is an aspheric lens.

5. The zoom lens optical system according to claim 1, wherein a side of the sixth lens facing a seventh lens is fused onto the iris diaphragm.

6. The zoom lens optical system according to claim 1, wherein a distance between the side of the sixth lens and the iris diaphragm is not greater than 0.2 mm ($\leq 0.2$ mm).

* * * * *